United States Patent
Beale et al.

(10) Patent No.: US 6,738,847 B1
(45) Date of Patent: May 18, 2004

(54) METHOD FOR ASSIGNING A MULTIPLICITY OF INTERRUPT VECTORS IN A SYMMETRIC MULTI-PROCESSOR COMPUTING ENVIRONMENT

(75) Inventors: Andrew Ward Beale, Aliso Viejo, CA (US); Derek William Paul, Mission Viejo, CA (US)

(73) Assignee: Unisys Corporation, Blue Bell, PA (US)

( * ) Notice: Subject to any disclaimer, the term of this patent is extended or adjusted under 35 U.S.C. 154(b) by 467 days.

(21) Appl. No.: 09/709,075

(22) Filed: Nov. 10, 2000

(51) Int. Cl.$^7$ .............................................. G06F 13/24
(52) U.S. Cl. ...................................... 710/260; 709/111
(58) Field of Search ................................. 710/260, 119; 709/100, 103, 104; 379/9.04

(56) References Cited

U.S. PATENT DOCUMENTS

| | | | |
|---|---|---|---|
| 4,484,270 A | | 11/1984 | Quernemoen et al. |
| 4,809,157 A | * | 2/1989 | Eilert et al. ................. 709/104 |
| 5,446,910 A | * | 8/1995 | Kennedy et al. ............ 710/119 |
| 5,506,987 A | * | 4/1996 | Abramson et al. .......... 709/103 |
| 5,923,887 A | * | 7/1999 | Dutton ........................ 710/260 |
| 6,205,508 B1 | * | 3/2001 | Bailey et al. ............... 710/260 |
| 6,269,390 B1 | * | 7/2001 | Boland ........................ 709/100 |
| 6,393,101 B1 | * | 5/2002 | Barshefsky et al. ....... 379/9.04 |

* cited by examiner

Primary Examiner—Glenn A. Auve
Assistant Examiner—Christopher E. Lee
(74) Attorney, Agent, or Firm—Nathan Cass; Mark T. Starr; Lise A. Rode

(57) ABSTRACT

A method is disclosed for use in a multi-processor computer system having a multiplicity of peripherals coupled thereto. The disclosed method assigns interrupt vectors from the multiplicity of peripherals, and includes the steps of determining if an interrupt resource from a given peripheral has already been assigned, and if not; assigning an affinity and vector to this interrupt resource. Moreover, a determination is made if the affinity and vector assigned in the previous step are within the operational characteristics of the multi-processor computer system.

12 Claims, 15 Drawing Sheets

FIG. 2

| BIT FOR PROC 0 | BIT FOR PROC 1 | BIT FOR PROC 2 | ... | BIT FOR PROC 27 | BIT FOR PROC 28 | BIT FOR PROC 29 | BIT FOR PROC 30 | BIT FOR PROC 31 |
|---|---|---|---|---|---|---|---|---|

GET NEXT AFFINITY

GetNextVectorFor

METHOD FOR ASSIGNING A MULTIPLICITY OF INTERRUPT VECTORS IN A SYMMETRIC MULTI-PROCESSOR COMPUTING ENVIRONMENT

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

This invention relates to multiprocessing data processing systems, and more particularly to symmetrical multiprocessor data processing systems that use either a clustered or flat multiprocessor architecture. More specifically, the present invention relates to a software method for routing interrupts within a multiprocessor system.

BACKGROUND OF THE INVENTION

Systems having coordinated multi-processors were first developed and used in the context of mainframe computer systems. More recently, however, interest in multiprocessor systems has increased because of the relatively low cost and high performance of many microprocessors, with the objective of replicating mainframe performance through the parallel use of multiple microprocessors.

A variety of architectures have been developed including a symmetrical multiprocessing ("SMP") architecture, which is used in many of today's workstation and server markets. In SMP systems, the processors have symmetrical access to all system resources such as memory, mass storage and I/O.

The operating system typically handles the assignment and coordination of tasks between the processors. Preferably, the operating system distributes the workload relatively evenly among all available processors. Accordingly, the performance of many SMP systems may increase, at least theoretically, as more processor units are added. This highly sought-after design goal is called scalability.

One of the most significant design challenges in many multiprocessor systems is the routing and processing of interrupts. An interrupt may generally be described as an event that indicates that a certain condition exists somewhere in the system that requires the attention of at least one processor. The action taken by a processor in response to an interrupt is commonly referred to as the "servicing" or "handling" of the interrupt.

Intel Corporation published a Multiprocessor (MP) specification (version 1.4) outlining the basic architecture of a standard multiprocessor system that uses Intel brand processors. Complying with the Intel Multiprocessor (MP) specification may be desirable, particularly when using Intel brand processors. According to the Intel Multiprocessor (MP) Specification (version 1.4), interrupts are routed using one or more Intel Advanced Programmable Interrupt Controllers (APIC). The APICs are configured into a distributed interrupt control architecture, as described above, where the interrupt control function is distributed between a number of local APIC and I/O APIC units. The local and I/O APIC units communicate over a bus called an Interrupt Controller Communications (ICC) bus. There is one local APIC per processor and, depending on the total number of interrupt lines in an Intel MP compliant system, one or more I/O APICs. The APICs may be discrete components separate from the processors, or integrated within the processors.

The destination of an interrupt can be one, all, or a subset of the processors in the Intel MP compliant system, hereinafter the interrupt "Affinity". The sender specifies the destination of an interrupt in one of two destination modes: physical destination mode or logical destination mode. In physical destination mode, the destination processor is identified by a local APIC ID. The local APIC ID is then compared to the local APIC's actual physical ID, which is stored in a local APIC ID register within the local APIC. The local APIC ID register is loaded at power up by sampling configuration data that is driven onto pins of the processor. For the Intel P6 family of processors, pins A11# and A12# and pins BR0# through BR3# are sampled. Up to 15 local APICs can be individually addressed in the physical destination mode.

The logical destination mode can be used to increase the number of APICs that can be individually addressed by the system. In the logical destination mode, message destinations are identified using an 8-bit message destination address (MDA). The MDA is compared against the 8-bit logical APIC ID field of the APIC logical destination register (LDR).

A Destination Format Register (DFR) is used to define the interpretation of the logical destination information. The DFR register can be programmed for a flat model or a cluster model interrupt delivery mode. In the flat model delivery mode, bits 28 through 31 of the DFR are programmed to 1111. The MDA is then interpreted as a decoded address. This delivery mode allows the specification of arbitrary groups of local APICs by simply setting each APIC's corresponding bit to 1 in the corresponding LDR. Broadcast to all APICs is achieved by setting all 8 bits of the MDA to one. As can be seen, the flat model only allows up to 8 local APICs to coexist in the system.

Unisys Corporation, assignee hereof, manufactures a multi-processor system like that described above under the model name ES7000. This system contains 96 PCI slots and up to 32 processors. To perform a function, a device connected to a PCI slot must send an interrupt vector to one of the processors. The code invoked by the interrupt vector must specifically instruct the processor what function to perform.

One approach for specifying the function the processor will perform is assigning a unique vector to every device needing an interrupt. Each peripheral will send a unique interrupt vector identifying the function. Each processor generally has a table mapping an interrupt vector to a particular function. In this case, the table for each processor will be identical.

As an example, the first peripheral can send an interrupt vector labeled '51,' the second peripheral '52,' the third peripheral '53,' and so on. Because the table for each processor is identical, the functions associated with interrupt vectors '51,' '52,' and '53' can correctly be referenced from any of the processors. Peripherals are not limited to using a single interrupt vector. In this example, the first peripheral could have sent vectors '50' and '51,' each referencing a different function call.

This approach can be expanded to use lowest priority routing, where the processor that is at the lowest Interrupt Request Level (IRQL), runs the Interrupt Service Routine (ISR) for the current interrupt. This feature improves performance by distributing interrupts in an efficient manner.

This approach, however, has one major drawback. The number of unique interrupts assigned to peripherals is limited to the total number of interrupt vectors that can be created. If the number of required vectors exceeds the number of available unique interrupt vectors, the peripherals which failed to obtain interrupt vectors will be inoperable. One solution to this involves sharing the physical interrupt line at the hardware level (The PCI specification amongst others defines a method to do this). The downside to this is that it results in extra overhead, typically in the operating system to establish which of the peripheral devices sharing the hardware interrupt line is requesting the interrupt. In a high performance system, the overhead involved in doing this may not be acceptable. Another solution, the subject of this application, is to break the limitation that all processors must have identical mapping tables, thereby significantly increasing the vector pool available in a multi-processor system.

SUMMARY OF THE INVENTION

Accordingly, by affinitizing each interrupt to a specific processor, unique interrupt vectors are no longer required. Instead, the same interrupt vector is sent to each processor, but each processor can point to a different interrupt subroutine (or "ISR"), allowing each interrupt vector to be interpreted differently depending upon which processor it is sent to. Additionally, the tables associated with each processor are no longer identical. Each processor may have a different function referenced by a particular interrupt vector. Because of the affinity between processor and peripheral, peripheral devices can still reference the desired function.

As an example, consider a system with a total of four processors and at least four peripherals. Processor one can be associated with peripheral two, processor two with peripheral one, processor three with peripheral three, and processor four with peripheral four. Peripherals one through four would send the same interrupt vector to their corresponding processors. Peripherals five and above would send different interrupt vectors for subsequent function requests.

Lowest priority routing allows more than one bit set in the destination set. The disclosed embodiment requires one and only one bit set in the destination set. Moreover, the disclosed method enables an enterprise server to fully populate its available I/O slots by allowing the complete vector pool to be available to each processor. This expands the number of vectors by the number of processors in the configuration. If two processors are available, then the number of interrupt vectors is effectively doubled. If thirty-two processors are available then there are thirty-two times as many interrupt vectors available. In certain configurations, this allows for a higher performance system, by removing the need to share the same interrupt line at the hardware level in the system.

These and other objects, which will become apparent as the invention is described in detail below, are provided by a set of data structures and algorithms which determine the allocation scheme best suited for optimizing a particular facet of vector allocation. The invention is a method for assigning a multiplicity of interrupt vectors in a symmetric multi-processor computing environment, wherein a multiplicity of peripherals are coupled to the multi-processor computer. The disclosed method assigns interrupt vectors from the multiplicity of peripherals, and includes the steps of determining if an interrupt resource from a given peripheral has already been assigned, and if not; assigning an affinity and vector to this interrupt resource. Moreover, a determination is made if the affinity and vector assigned in the previous step are within the operational characteristics of the multi-processor computer system.

It is an object of the present invention to provide greater peripheral connectivity in a multi-processor system.

Another object of the present invention is to provide verification of operation within the operational characteristics of a given computing platform.

An advantage of the present invention is the ability to connect a greater number of peripherals to a given multi-processor system without the need to share interrupts at the hardware level.

Another advantage of the present invention is to improve the performance of the computing platform in certain applications.

Still other objects and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts, and which drawings form a part of this application.

BRIEF DESCRIPTION OF THE DRAWINGS

FIG. 2 is a diagram illustrating the internal representation of Affinity.

DETAILED DESCRIPTION OF ONE EMBODIMENT

Figure 1A:
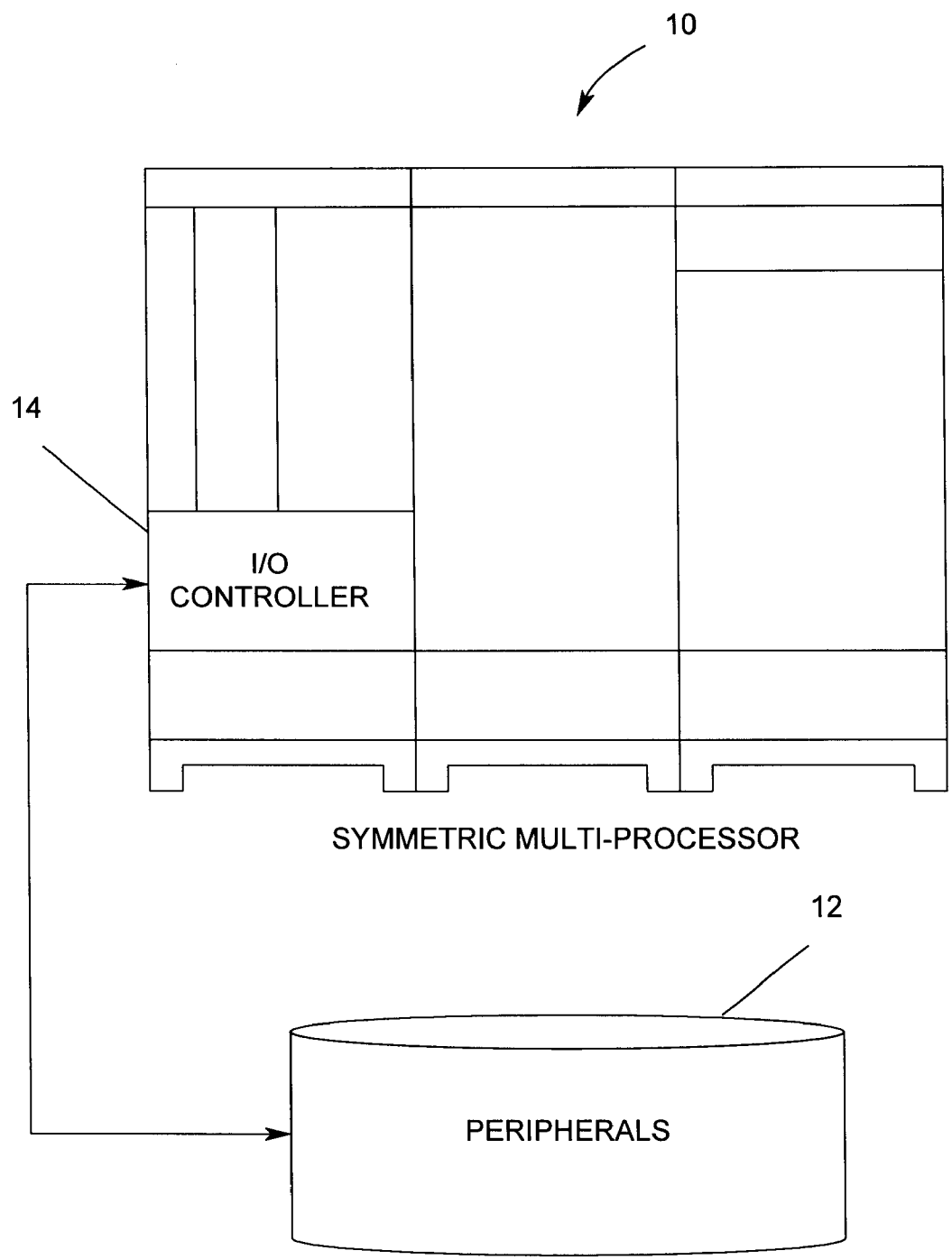
FIG. 1A is a block diagram of a multi-processor computing system which may employ the method of the present invention.

Referring now to the drawings, and FIG. 1A in particular, a block diagram of a multiprocessor computing system 10 that may employ the method of the present invention is shown coupled to peripherals 12 by means of an I/O controller 14. An exemplary system 10 is described in one or more of the following patents and applications assigned to the same assignee hereof: Computer System and Method for Operating Multiple Operating Systems in Different Partitions of the Computer System and for Allowing the Different Partitions to Communicate with One Another through Shared Memory, by Robert C. Gulick, et al, Ser. No. 09/120,797, parent filed Jul. 23, 1998; Centralized Hardware Control of Multisystem Access to Shared and Non-shared Subsystems, U.S. Pat. No. 4,484,270; Method and Apparatus For Initiating Execution of an Application Processor in a Clustered Multiprocessor, by Penny L. Svenkeson, et al, Ser. No. 09/362,388; Method and Apparatus for Routing Interrupts in a Clustered Multiprocessor System by Doug E. Morrissey, Ser. No. 09/362,289; and, Adapter for Coupling a Legacy Operating System to a Driver of an I/O Channel which has an Incompatible Native Operating System Interface, Ser. No. 09/296,948.

Figure 1B:
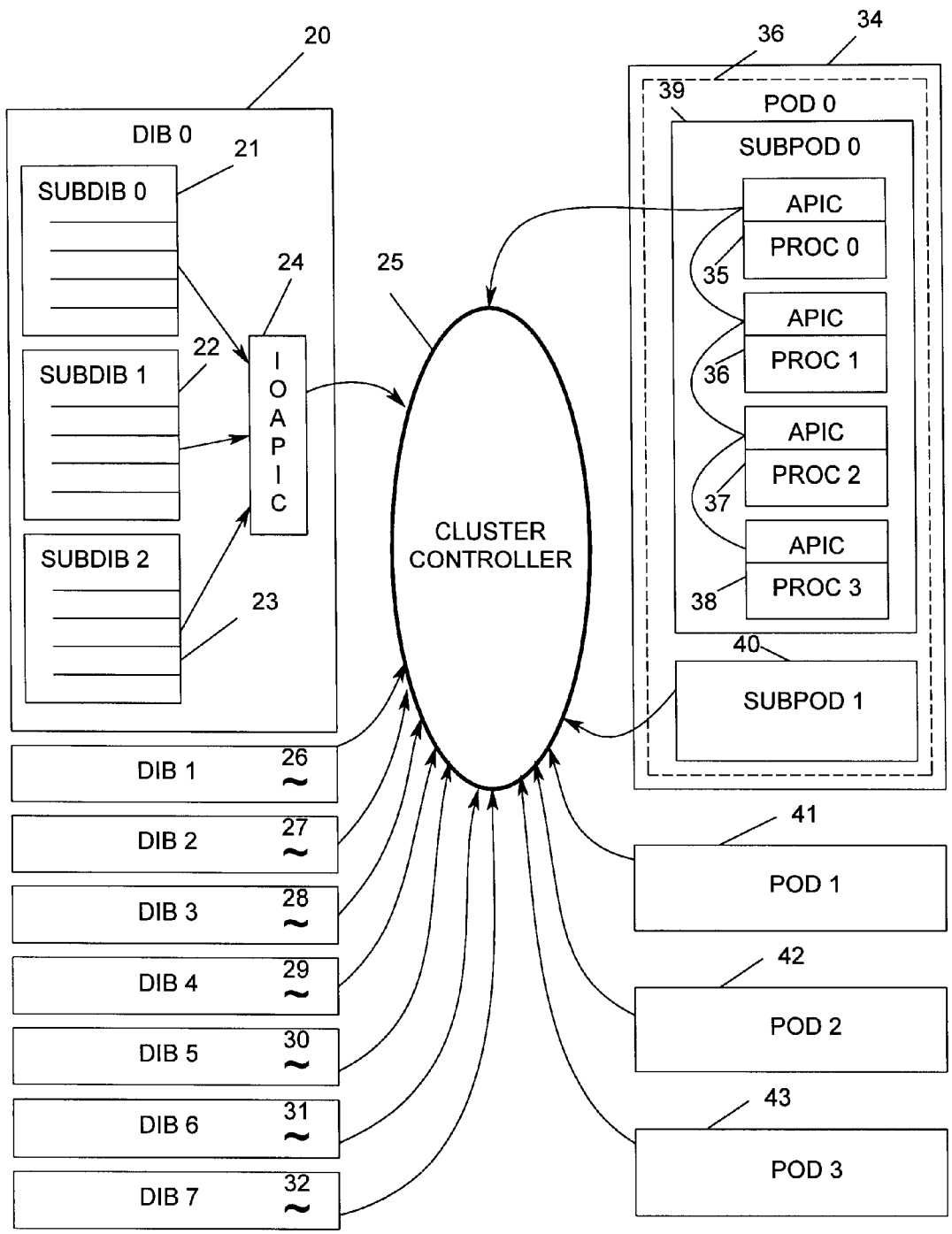
FIG. 1B is a more detailed block diagram of the multi-processor of FIG. 1A.

Referring now to FIG. 1B, a more detailed block diagram of the multi-processor computing system 10 is shown. A Direct I/O Bridge (DIB) 20 includes three SUBDIB's 21, 22 and 23, which are coupled to an I/O APIC 24. The I/O APIC 24 is coupled to a cluster controller 25, which routes interrupts to an appropriate cluster of processors (e.g., SUBPOD 39, described below). Additional DIB's 26, 27, 28, 29, 30, 31 and 32 are internally coupled in a like manner and coupled as well to the cluster controller 25.

A first POD 34 is illustrated as containing four processors 35, 36, 37 and 38, within a SUBPOD 39. Each of the processors 35 through 38 is coupled to a dedicated APIC, which are in turn coupled to the cluster controller 25. A second SUBPOD 40 is contained within the POD 34 and is internally coupled in the same manner as the SUBPOD 39, which in turn is coupled to the cluster controller. Additional PODS 41, 42, and 43 are internally coupled in a similar manner and further coupled to the cluster controller 25. The details of the above-described structure and operation thereof is further described in any of the patent applications listed hereinabove.

Referring now to FIG. 2, a diagram is show of the internal representation of Affinity. Essentially, this is a bit mask, wherein one bit is used for each processor. Affinity is represented by the bits set to 1 within the variable. One and only one bit will be set in the disclosed implementation of 32 processors. A bit rotates from one position to the next for interrupt Affinity.

Figure 3:
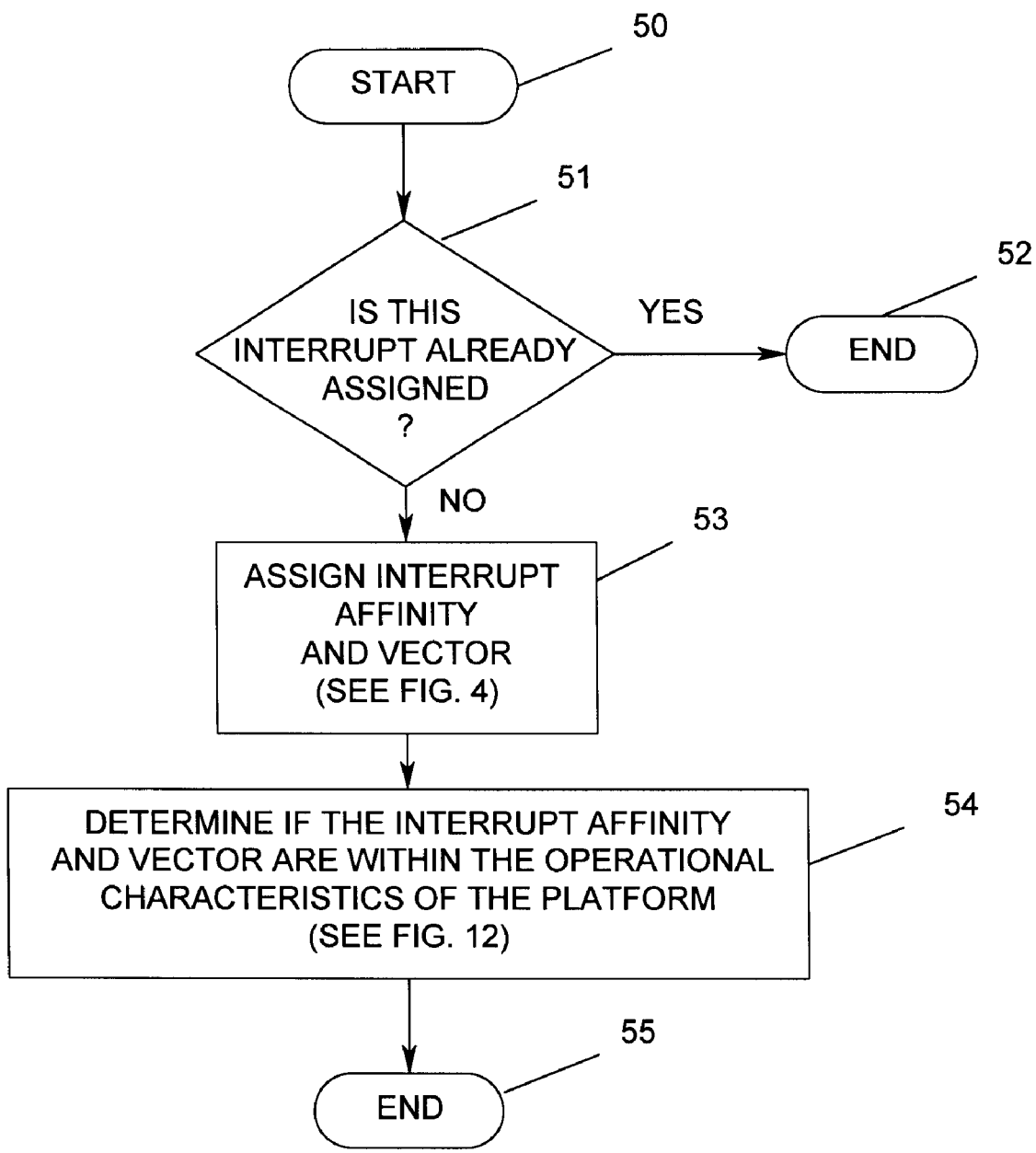
FIG. 3 is an flow chart of the method of the present invention.

Referring now to FIG. 3, a flow chart of the interrupt assignment process is shown. The process begins with a start bubble 50 followed by an inquiry as to whether or not this interrupt has already been assigned (diamond 51). If the answer is yes, then the process ends (bubble 52). On the other hand, if it has not been assigned, then an affinity and vector are assigned (block 53), which process step is amplified further hereinbelow and illustrated in FIG. 4. Next, a determination is made if the interrupt Affinity and vector are within the operational characteristics of the platform on which this process operates (block 54) and the process ends (bubble 55). The step 54 evaluates proposed interrupt vector assignments to determine if the assignment is within operation parameters of the platform executing the method of this invention.

Figure 4:
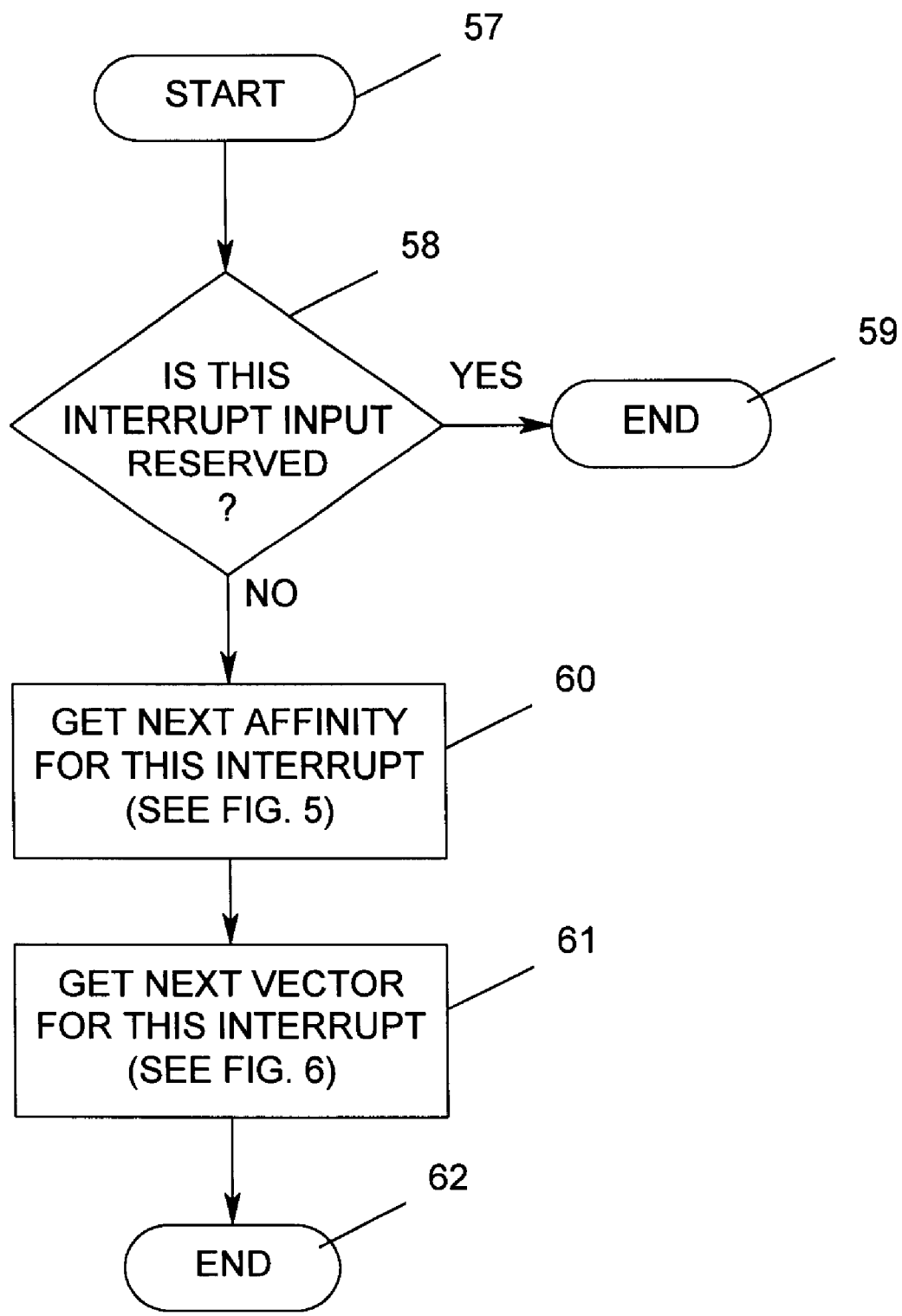
FIG. 4 is a flow chart of the process for assigning an Affinity and Vector.

Referring now to FIG. 4, a flow chart of the process for getting the next vector is shown. The process begins with a start bubble 57 followed by an inquiry as to whether or not this interrupt input is reserved (diamond 58). If the answer is yes, then the process ends (bubble 59). On the other hand, if the interrupt input is not reserved, then the next affinity for this interrupt is obtained (block 60). This step will be amplified further hereinafter and illustrated in FIG. 5. Next, the next vector for this interrupt is obtained (block 61). This step will be amplified further hereinafter and illustrated in FIG. 6. After this, the process ends (bubble 62).

Figure 5:
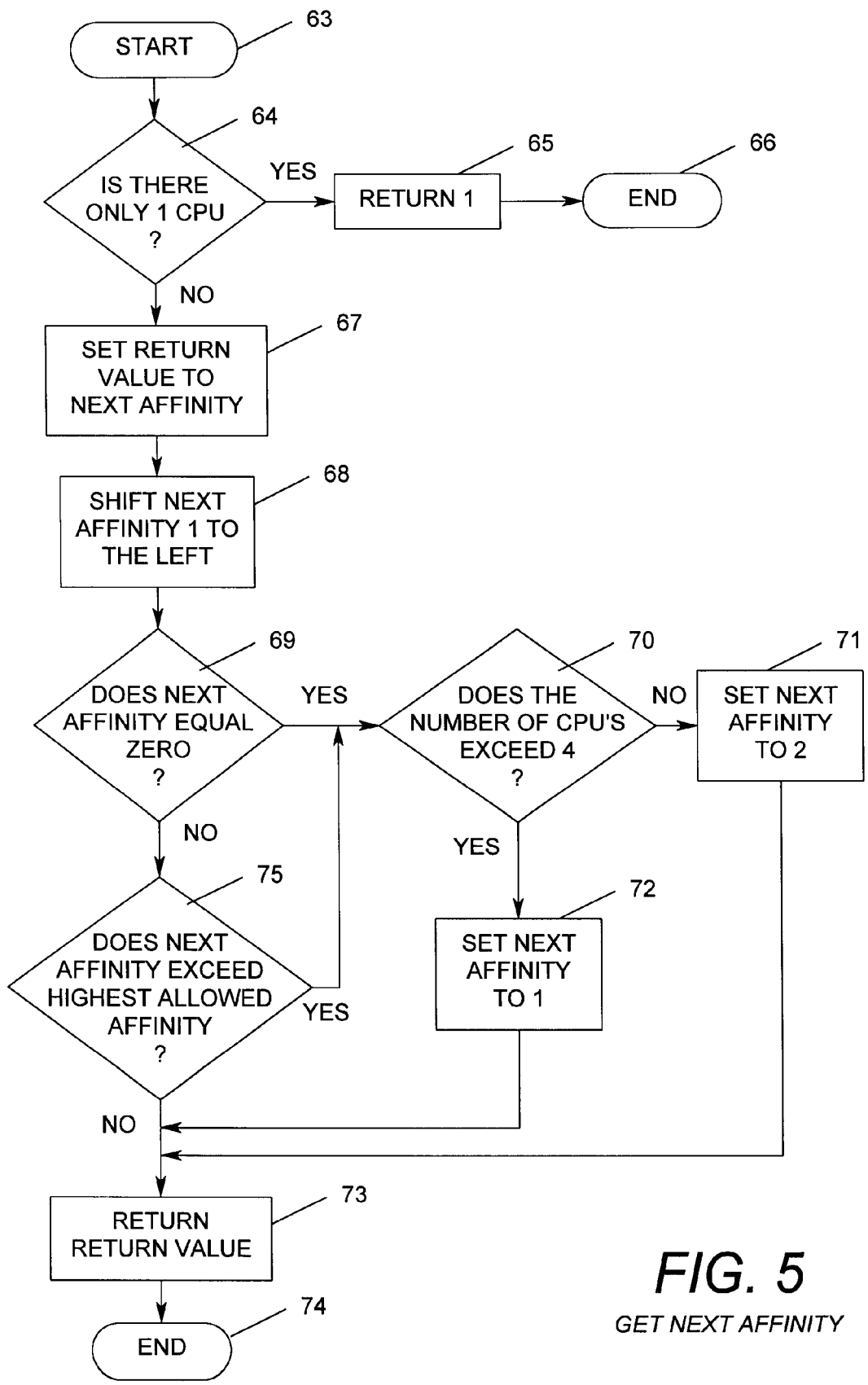
FIG. 5 is a flow chart of the process for getting the next Affinity.

Referring now to FIG. 5, the process for getting the next affinity is shown. The process begins with a start bubble 63 followed by an inquiry as to whether or not there is only one CPU (diamond 64). If the answer to this inquiry is yes, then a return of 1 is made to signify that the affinity is assigned to the first processor (block 65) and the process ends (bubble 66). On the other hand, if there is NOT only one CPU then a return value is set to Next Affinity (block 67). After this, Next Affinity is shifted one to the left (block 68) and an inquiry is made as to whether or not Next Affinity equals zero (diamond 69). If the answer to this inquiry is yes, then another inquiry is made as to whether or not the number of CPU's exceeds four (4) (diamond 70). If the answer to this latter inquiry is no, then Next Affinity is set to two (2). On the other hand, if the answer to this inquiry is yes (i.e., the number of CPU's exceeds four) then the Next Affinity is set to one (1) (block 72). Upon completion of either step depicted by the blocks 71 or 72, then a Return Value is returned (block 73) and the process ends (bubble 74).

If Next Affinity does not equal zero, (diamond 69), then yet another inquiry is made as to whether or not Next Affinity exceeds the highest allowed affinity (diamond 75). If the answer to this inquiry is yes, then a return is made back to the diamond 70 to determined in the number of CPU's exceeds four. On the other hand, if the Next Affinity does not exceed the highest allowed affinity, then a Return Value is returned (block 73) and the process ends (bubble 74).

The steps just described are necessary in order to detect the boundary condition that exists when the left shift results in the one (1) being shifted out of the highest order bit, which results in a zero state. An affinity must have one and only one bit turned on in order to affinitize the vector to one and only one processor. If the number of CPU's is greater than four (4), then the value of two will essentially eliminate the first processor from getting any more interrupt vectors assigned to it. Typically, the first processor is handling all the reserved interrupts and so if we have four or more processors, skipping the first processor for the non-reserved processors prevents the first processor from always having more interrupts to handle than the others, which results in a very simple form of load balancing.

Figure 6:
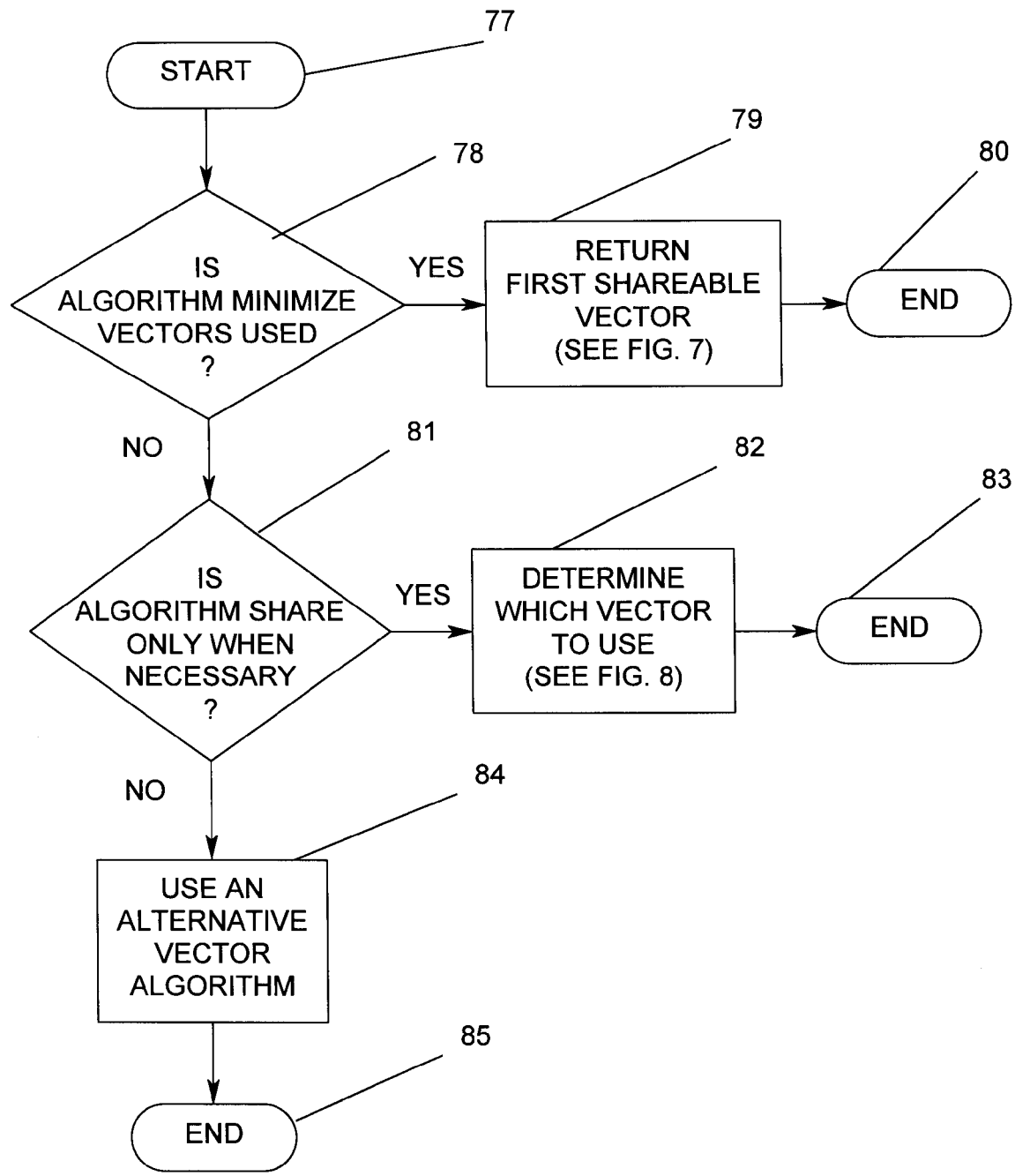
FIG. 6 is a flow chart of the process for getting the next Vector.

Referring now to FIG. 6, the process for GetNextVector-For is shown. The process begins with a start bubble 77 followed by an inquiry as to whether or not Algorithm Minimize Vectors is used (diamond 78). If the answer to this inquiry is yes, then a First Sharable Vector is returned (block 79) and the process ends (bubble 80). The process step depicted by the block 82 is amplified hereinbelow and illustrated in detail in FIG. 7. On the other hand, if the answer to the inquiry in the diamond 78 is no, then another inquiry is made as to whether or not Algorithm shares only when necessary (diamond 81). If the answer to this inquiry is yes, then a determination is made as to which vector to use (block 82) and the process ends (bubble 83). The process step depicted by the block 82 is amplified hereinbelow and illustrated in detail in FIG. 8.

If the answer to the inquiry in the diamond 81 is no, then an alternative vector algorithm may be used (block 84) and the process ends (bubble 85).

Figure 7:
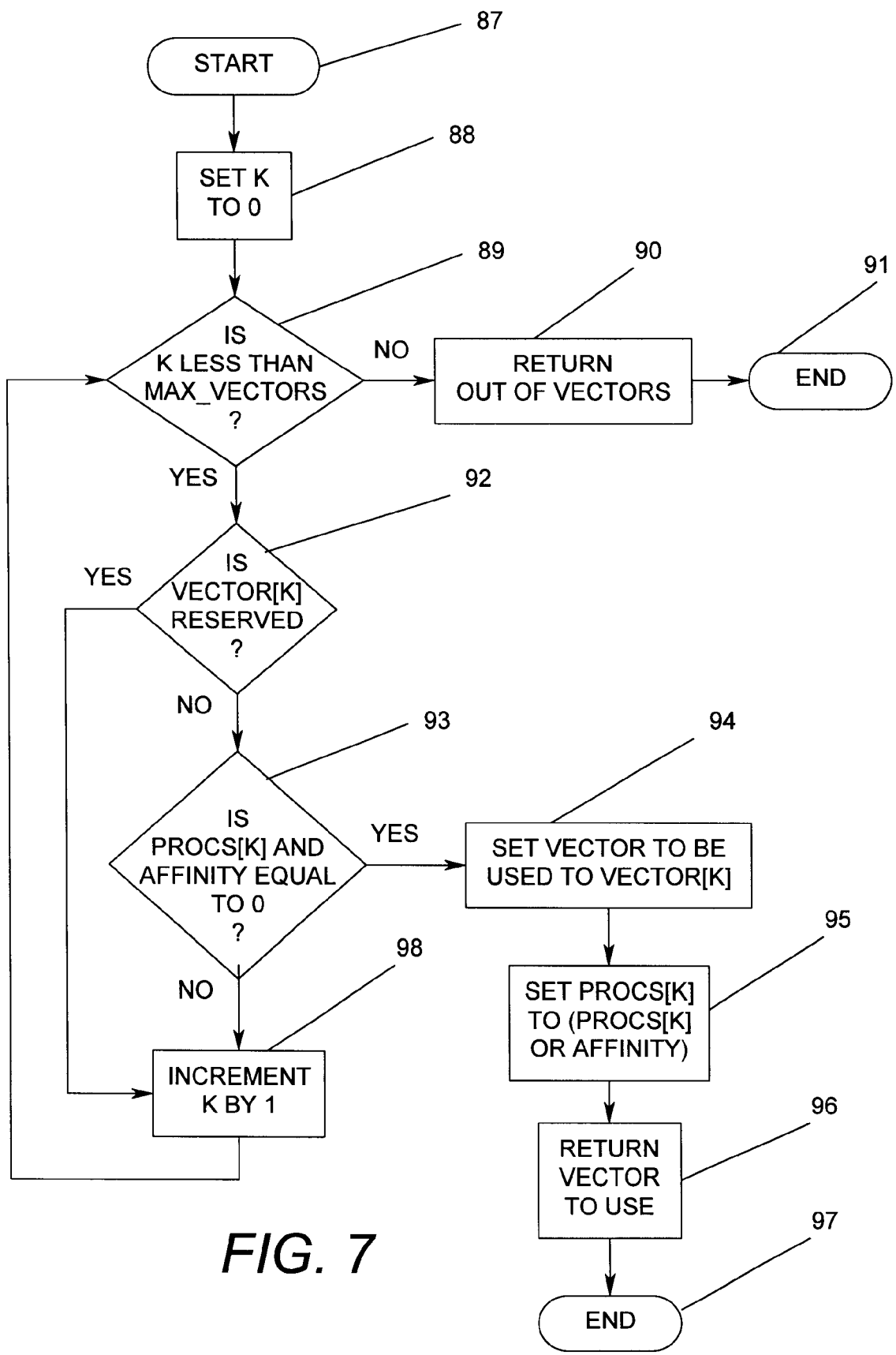
FIG. 7 is a flow chart of the process for returning a first shareable vector.

Referring now to FIG. 7, the process for the returning a first shareable Vector is shown. The process begins with a start bubble 87 followed by a process step of setting K equal to zero (0) (block 88), wherein K is a variable used as an initialization index into an array. After this, an inquiry is made as to whether or not K is less than the maximum number of Vectors allowable (diamond 89). If the answer to this inquiry is no, then a return is made to indicate "out of vectors" (block 90), which means that there are no more vectors to give, and the process ends (bubble 91).

On the other hand, if K is less than the maximum number of vectors, then another inquiry is made as to whether or not Vector [K] is reserved (diamond 92). If the answer to this inquiry is no, then yet another inquiry is made as to whether or not Procs[K] and Affinity are equal (diamond 93). Procs [K], also referred to herein as Int_Procs [K], is a data structure that records which processors have had a particular vector allocated to their use. Affinity is a mask (compatible with the Procs data structure) of the desired affinity. If the answer to this inquiry is yes, then the vector to be used is set to Vector [K] (block 94); i.e., the vector is available for use on the specified processor. Next, the Procs[K] is set to (Procs[K] or Affinity) (block 95). After this, the vector to be used is returned (block 96) and the process ends (bubble 97).

If the answer to the inquiry in the diamond 92 is yes, or if the answer to the inquiry in the diamond 93 is no, then K is incremented by one (1) (block 98) After this, a return is made back to the diamond 89.

A result of performing the above described steps is that the same interrupt vector can be shared across the processors in a multi-processor system, and have a different interrupt service routine in each processor. Where the interrupt vector is shared across the processors in a multi-processor system, and each processor has the same interrupt service routine, the interrupt handlers for each shared device are typically chained together. Hence, with the implementation described above, less overhead is required in the servicing of the interrupt than that used by the prior art. Accordingly, one may have many unique interrupts without having to share interrupts at the hardware level.

Figure 8:
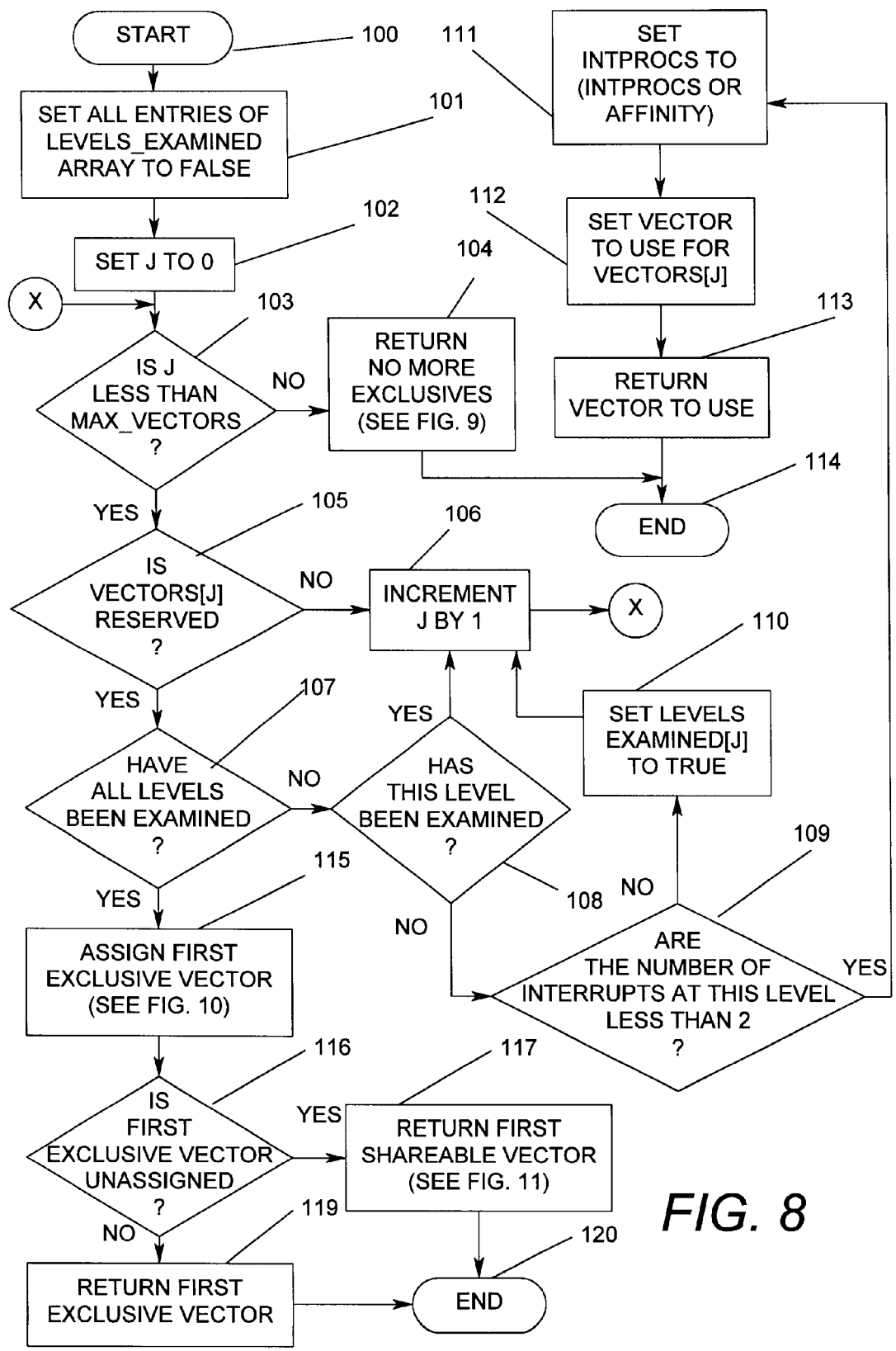
FIG. 8 is a flow chart of the process for determining which Vector to use.

Referring now to FIG. 8, the process for determining which vector to use is shown. The process begins with a start bubble 100 followed by a step of setting all entries of an array identified as Levels_Examined Array to FALSE (block 101). The Levels_Examined array is an optimization technique that records interrupt levels have been examined and resulted in an unsatisfactory assignment. In this way, if a given level was unsatisfactory, all vectors that are assigned at the same level will be skipped as they too will be unsatisfactory. Next, J is set to zero (0), wherein J is a variable used as an index into the array (block 102). After this, an inquiry is made as to whether or not J is less than a constant, Max_Vectors, (diamond 103). If the answer to this inquiry is no, then no more exclusive vectors are to be returned (block 104), which step is amplified hereinbelow and illustrated in greater detail in FIG. 9.

If the answer to the inquiry in the diamond 103 is yes, then another inquiry is made as to whether or not Vectors[J], which is a data structure that contains a pool of available vectors, is reserved (diamond 105). If the answer to this latter inquiry is no, then the variable J is incremented by one (1). On the other hand, if the answer to this inquiry is yes, then yet another inquiry is made as to whether or not all levels of vectors have been examined (diamond 107). If the answer to this latter inquiry is no, then still another inquiry is made as to whether or not this level has been examined (diamond 108). If the answer to the inquiries depicted by the diamonds 105 or 108 are either one a no, then the variable J is incremented by one (1) (block 106). Upon completion of this step a return is made back to the step depicted by the diamond 103, as denoted by a connector X.

If this level has not been examined (diamond 108), then yet another inquiry is made as to whether or not the number of interrupts at this level is less than two (2) (diamond 109); and if not, Levels_Examined[J] (defined hereinabove), is set to true (block 110). Upon completion of this step a return is made back to the step depicted by the block 106. On the other hand, if the answer to the inquiry depicted by the diamond 109 is yes, then another array, IntProcs, is set to (IntProcs or Affinity) (block 111). Next, the vector to use for Vectors[J] is set (block 112); then the vector to use is returned (block 113) and the process ends (bubble 114).

Returning focus to the inquiry depicted by the diamond 107, if all levels have been examined, then the first exclusive vector is assigned (block 115), which step is amplified further hereinbelow and illustrated in greater detail in FIG. 10. After this, an inquiry is made as to whether or not the first exclusive vector is unassigned (diamond 116). If the answer to this inquiry is yes, then the first shareable vector is returned (block 117). This latter step is amplified further hereinbelow and illustrated in greater detail in FIG. 11. On the other hand, if the first exclusive vector is not unassigned then the first exclusive vector is returned (block 119) and the process ends (bubble 120). It is noted that upon completion of the step depicted by the block 117, the process also ends (bubble 120).

Figure 9:
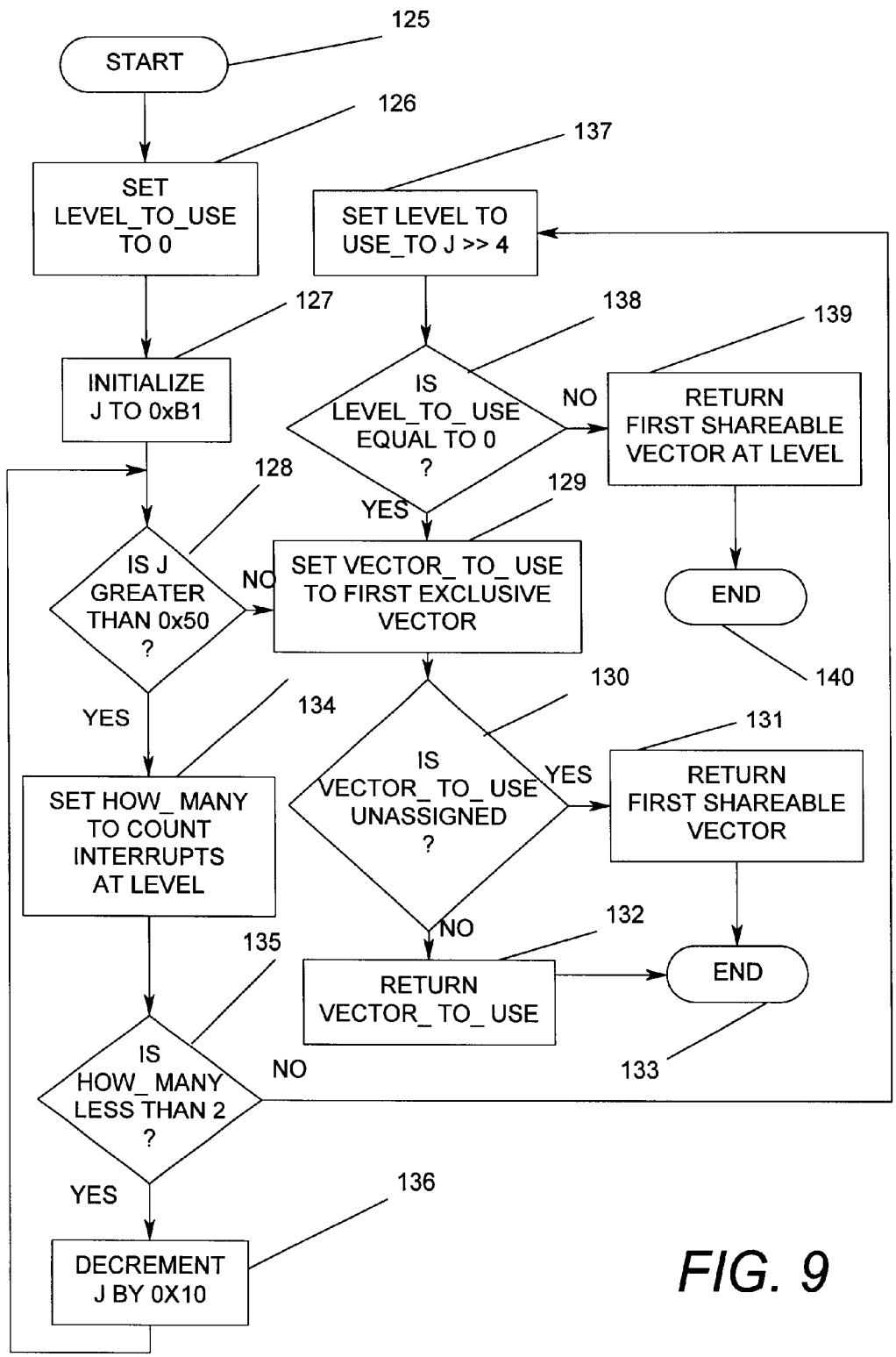
FIG. 9 is a flow chart of the process for handling the situation where there are no more exclusive Vectors.

Referring now to FIG. 9, a flow chart of the process for handling the situation where there are no more exclusive Vectors is shown. The process begins with a start bubble 125 followed by a step of setting the level to Use to zero (0) (block 126). This is necessary in order to ensure that it has been initialized. Next, the variable J is initialized to an appropriate value for the computing platform, 0×B0 (hexadecimal) in this example. After this, an inquiry is made as to whether or not the variable J is greater than the hexadecimal value of 0×50 (diamond 128). If the answer to this inquiry is no, then the vector to use is set to the first exclusive vector (block 129). Since the level is determined by the most significant nibble of the hex value of J, we decrement by 0×10 to in effect walk the levels from the highest down to the lowest level allowed for the computing platform, which in this example is 5.

Following the above, an inquiry is then made as to whether or not the vector to use is unassigned (diamond 130). If the answer to this inquiry is yes, then the step of returning the first shareable vector is performed (block 131). On the other hand, if the answer to inquiry depicted by the diamond 130 is no, then a return is made of the vector to use (block 132) and the process ends (bubble 133). It is noted that the process also ends after performing the step depicted by the block 131.

Figure 10:
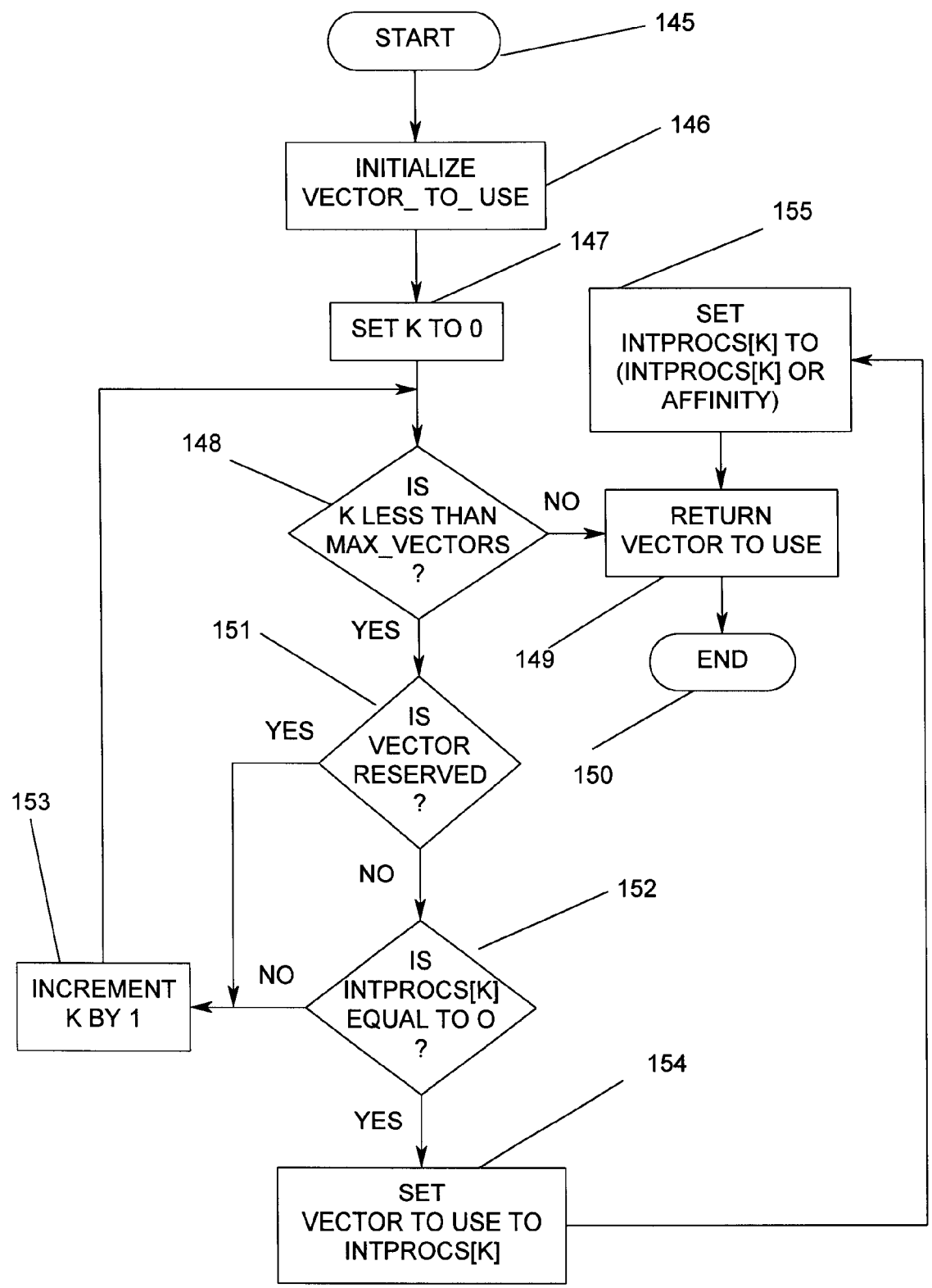
FIG. 10 is a flow chart of the process for assigning the first exclusive Vector.

Referring now to FIG. 10 a flow chart of the process for assigning the first exclusive Vector is shown. The process begins with a start bubble 145 followed by a step of initializing the vector to use (block 146). Next, the variable K is set to zero (0) (block 147). After this, an inquiry is made as to whether or not the variable K is less than Max_Vectors (diamond 148), indicating that more vectors are still available for examination. If the answer to this inquiry is no, then the vector to use is returned (block 149) and the process ends (bubble 150).

If the variable K is less than the Max_Vectors (diamond 148), then another inquiry is made as to whether or not the vector is reserved (diamond 151). If the answer to this inquiry is no, then still another inquiry is made as to whether or not the array Int_Procs[K] is equal to zero (0) (diamond 152). The array Int_Procs[K] is the same as the Procs[K] array defined hereinabove. If the answer to this latter inquiry is no, or if the answer to the inquiry depicted by the diamond 151 is yes, then the variable K is incremented to one (1) and a return is made back to the inquiry depicted by the diamond 148). On the other, if the answer to the inquiry depicted by the diamond 152 is yes, then the vector to use is set to Int_Procs[K] (block 154) and then the array Int_Procs[K] is set to (Int_Procs[K] or Affinity) (block 155). This is then returned as the vector to use (block 149) and the process ends (bubble 150).

Figure 11A:
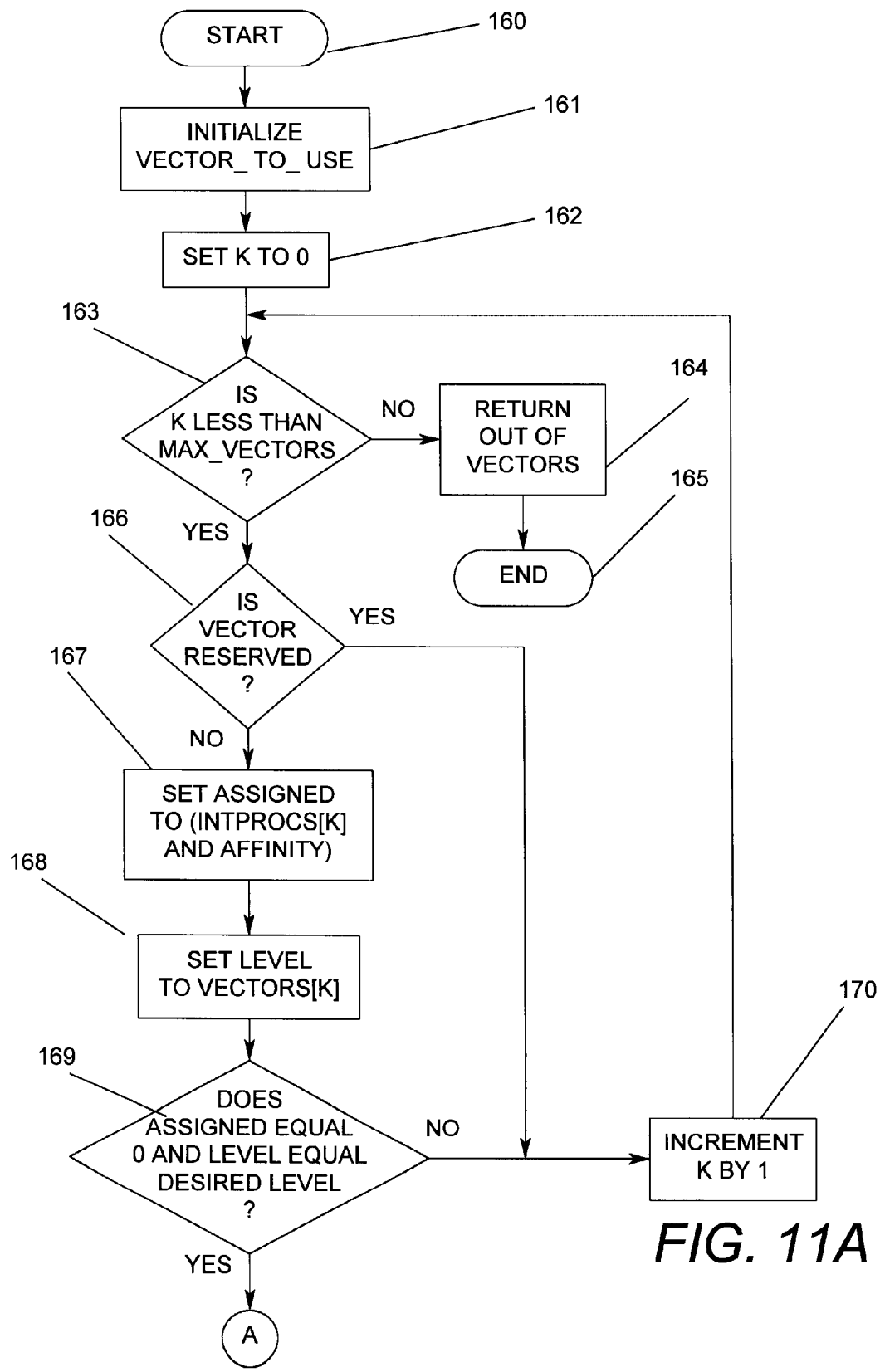
FIGS. 11A and 11B combined form a flow chart of the process for returning the first shareable Vector.

Referring now to FIG. 11A, the first of a two-sheet drawing of a flow chart of the process for returning the first shareable Vector is shown. The process begins with a start bubble 160 followed by a step of initializing the vector to use (block 161). Next, the variable K is set to zero (0) (block 162). After this, an inquiry is made as to whether or not the variable K is less than the Max_Vectors (diamond 163). If the answer to this inquiry is no, then a return is made that we are out of vectors (block 164) and the process ends (bubble 165).

If it is determined that the variable K is less than Max_Vectors (diamond 163), then another inquiry is made as to whether or not the vector is reserved (diamond 166). If the answer to this latter inquiry is no, then Assigned is set equal to (Int_Procs[K] or Affinity) block 167. Next, the level is set to Vectors[K] (block 168). After this, yet another inquiry is made as to whether or not Assigned equals zero (0) and Level equals the desired level (diamond 169). If the answer to this inquiry is no, then the variable K is incremented by one (1) (block 170) and a return is made back to the step depicted by the diamond 163. On the other hand, if the answer to this inquiry is yes, then the process illustration continues in FIG. 11B as denoted by a connector A.

Figure 11B:
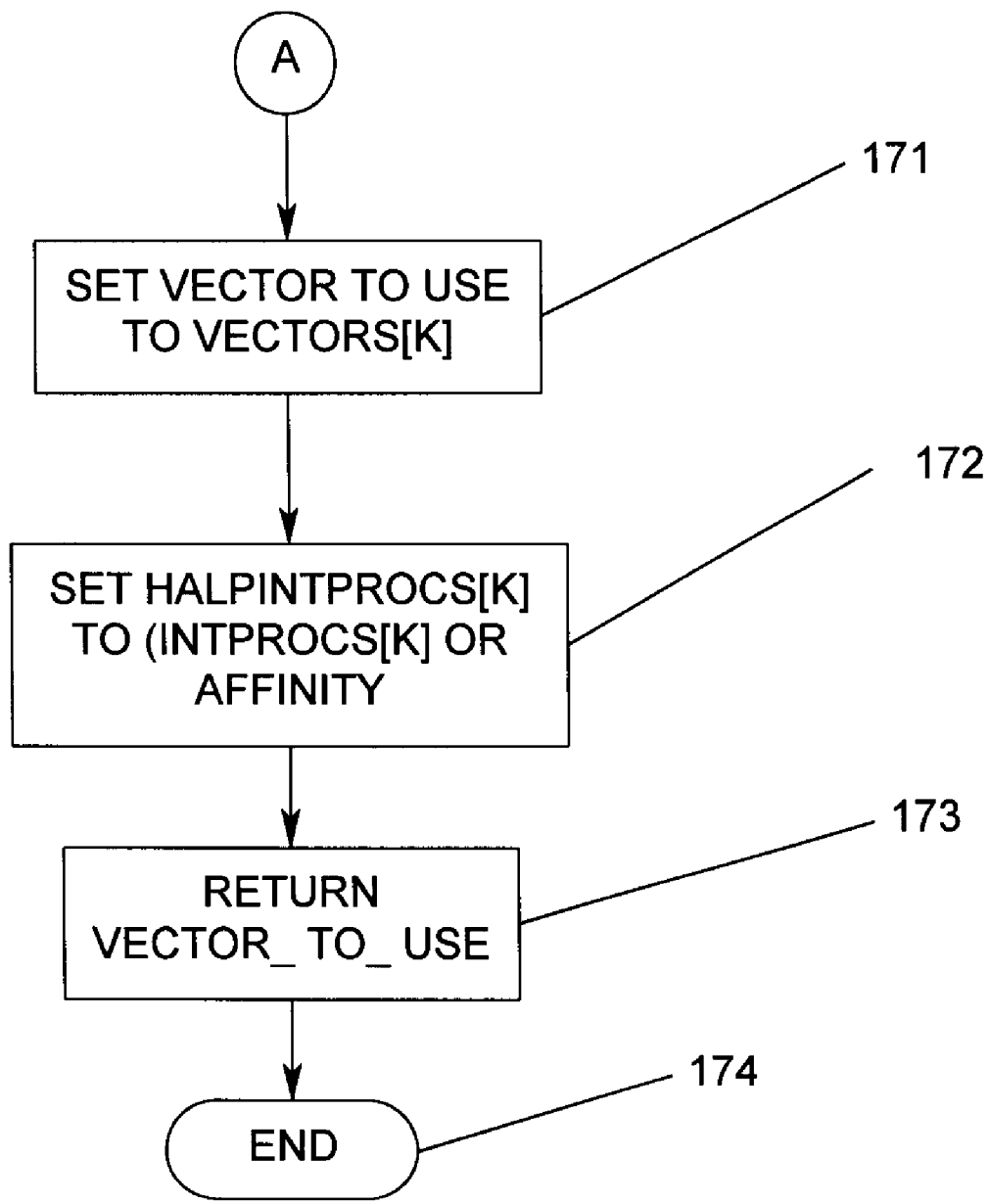

Referring now to FIG. 11B at the connector A, the vector to use is set to Vectors[K] (block 171) and Int_Procs[K] is set to (Int_Procs[K] or Affinity) (block 172). This is then returned as the vector to use (block 173) and the process ends (bubble 174).

Figure 12:
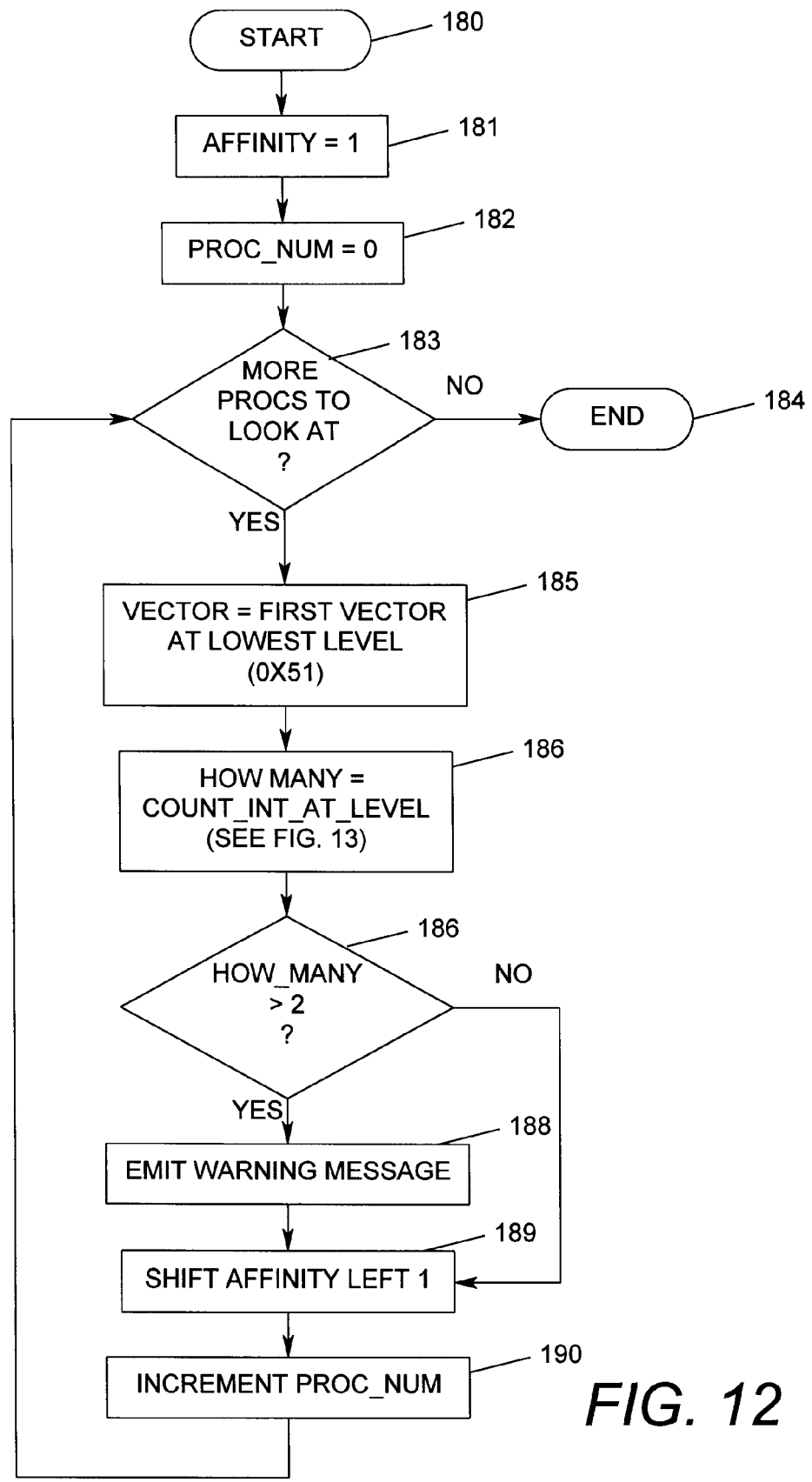
FIG. 12 is a flow chart of process for determining if the interrupt affinity and vector are within the operational characteristics of the computing platform.

Referring now to FIG. 12, a flow chart of the process for determining if the interrupt affinity and vector are within the operational characteristics of the computing platform. The process begins with a start bubble 180 followed by a step of setting Affinity equal to one (1) (block 181). Next, the processor number (Proc_Num) is set to zero (0) (block 182). After this, an inquiry is made as to whether or not there are more processors to look at (diamond 183). If the answer to this inquiry is no, then this process ends (bubble 184).

On the other hand, if the answer to the inquiry depicted by the diamond 183 is yes, then Vector is set equal to the first vector at the lowest level (i.e., in one embodiment hexadecimal 0×51) (block 185). Next, How Many is set equal to Count_Int_At_Level (block 186). This returns the actual number of interrupts that have been assigned vectors at a specific level. Further details of this step of the process are amplified hereinbelow and illustrated in FIG. 13.

Following the above, another inquiry is made as to whether or not How Many is greater than 2 (diamond 187). This is done to assess the risk to the platform on which this process operates. The test may vary from one platform to another depending upon its operational characteristics. If the answer to this inquiry is yes, then, in one embodiment of this invention, a warning message is emitted (sent to the user for viewing on a debugger) (block 188). Next, Affinity is shifted left by one (1) (block 189) and the processor number (Proc_Hum) is incremented (block 190). After this, a return is made back to the diamond 183 to determine if there are more processors. If the answer to the inquiry depicted by the diamond 187 is no, then the warning message is not sent to the user (i.e., block 188 is skipped).

Figure 13:
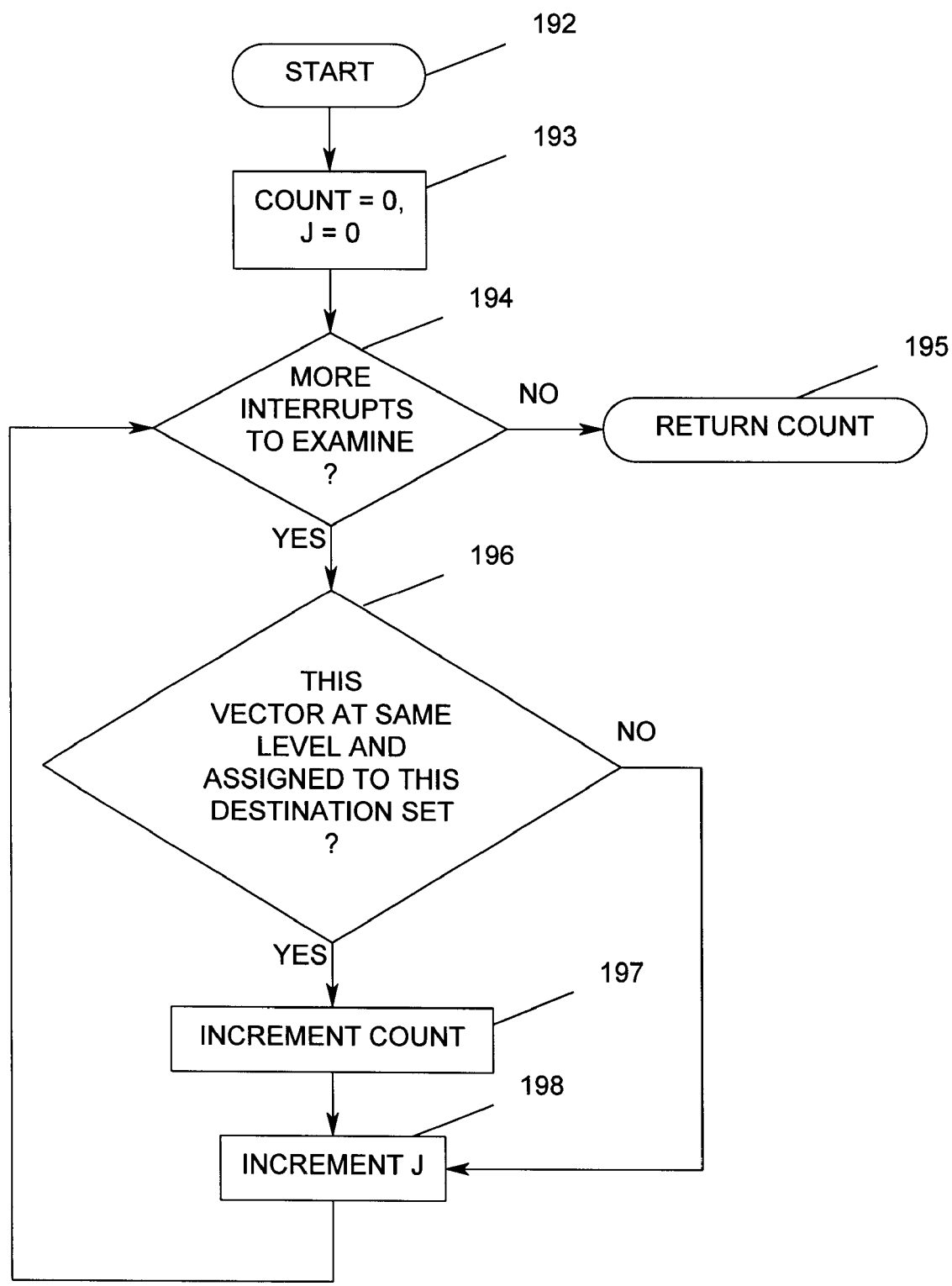
FIG. 13 is a flow chart of the process for determining how many interrupts are at a given level.

Referring now to FIG. 13, a flow chart of the process for determining how many interrupts are at the same level. The process begins with a start bubble 192 followed by a step of setting Count equal to zero (0) and J (which is a variable) equal to zero (0) as well (block 193). Next, an inquiry is made as to whether or not there are more interrupts to examine (diamond 194). If the answer to this inquiry is no, then Count is returned to the process shown in FIG. 12 that called this process (bubble 195). On the other hand, if the answer to this inquiry is yes, then another inquiry is made as to whether or not this vector is at the same level and assigned to this destination set (diamond 196). This is done to assure that we are within the operational characteristics of the platform upon which this process is operating.

If the answer to the inquiry depicted by the diamond 196 is yes, then Count is incremented by one (1) (block 197). J is next incremented (block 198) and a return is made back to the diamond 194 for more interrupts to examine. On the other hand, if the answer to the inquiry depicted by the diamond 196 is no, then the step of incrementing Count (block 197) is skipped. This is done because this interrupt is not at the required level.

The methods and apparatus of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. In a multi-processor computer system having a multiplicity of peripherals coupled thereto, a method for assigning interrupt vectors from aid multiplicity of peripherals, said method comprising the steps of:
   a. determining if an interrupt resource from a given peripheral has already been assigned, and if not;
   b. assigning an affinity and vector to said interrupt resource comprising:
      (b1) determining if said interrupt resource is reserved, and if not;

(b2) obtaining an affinity for said interrupt resource from a variable rotating destination set comprising:
  (b21) shifting said affinity to the left;
  (b22) detecting where said affinity shifts off the end;
  (b23) determining the next processor in series available for an interrupt; and,
  (b24) returning a value representing the next processor available for an interrupt; and
(b3) obtaining a vector for said interrupt resource from an available vector array;
c. determining if the affinity and vector assigned in the previous step are within an operational characteristic of said multi-processor computer system.

2. The method as in claim 1, where step c thereof further comprises determining which algorithm is to be used for obtaining a vector.

3. The method as in claim 2, where it is determined that an algorithm selected minimizes the number of vectors used, returning a first shareable vector.

4. The method as in claim 3, further comprising the steps of:
a. determining if out of vectors, and if not;
b. determining if a vector under consideration has been reserved, and if not;
c. determining if this vector has previously been used on this destination set, and if not;
d. returning this vector for use on this destination set and recording this fact.

5. The method as in claim 4, wherein it is determined that this vector has previously been used on this destination set, further including the steps of:
a. setting the vector to used to a variable, Vector[K];
b. setting a variable Procs[K] to (Procs[K] or Affinity); and,
c. returning this vector as the vector to use.

6. The method as in claim 1, wherein step c thereof further includes the steps of:
a. examining each assigned vector for having an affinity for a given destination set and being at a required level;
b. counting how many assigned vectors are at a given level for a specific destination set;
c. if the count of assigned vectors exceeds a threshold of operational characteristics of said computer system, issuing a warning signal to a user thereof.

7. A storage medium encoded with machine-readable computer program code for use in a multi-processor system having a multiplicity of peripherals coupled thereto, a method for assigning interrupt vectors from said multiplicity of peripherals, wherein, when the computer program code is executed by a computer, the computer performs the steps of:
a. determining if an interrupt resource from a given peripheral has already been assigned, and if not;
b. assigning an affinity and vector to said interrupt resource comprising:
  (b1) determining if said interrupt resource is reserved, and if not;
  (b2) obtaining an affinity for said interrupt resource from a variable rotating destination set comprising:
    (b21) shifting said affinity to the left;
    (b22) detecting where said affinity shifts off the end;
    (b23) determining the next processor in series available for an interrupt; and,
    (b24) returning a value representing the next processor available for an interrupt; and
  (b3) obtaining a vector for said interrupt resource from an available vector array;
c. determining if the affinity and vector assigned in the previous step are within an operational characteristic of said multi-processor computer system.

8. The storage medium as in claim 7, where step c thereof further comprises determining which algorithm is to be used for obtaining a vector.

9. The storage medium as in claim 8, where it is determined that an algorithm selected minimizes the number of vectors used, returning a first shareable vector.

10. The storage medium as in claim 9, further comprising the steps of:
a. determining if out of vectors, and if not;
b. determining if a vector under consideration has been reserved, and if not;
c. determining if this vector has previously been used on this destination set, and if not;
d. returning this vector for use on this destination set and recording this fact.

11. The storage medium as in claim 10, wherein it is determined that this vector has previously been used on this destination set, further including the steps of:
a. setting the vector to used to a variable, Vector[K];
b. setting a variable Procs[K] to (Procs[K] or Affinity); and,
c. returning this vector as the vector to use.

12. The storage medium as in claim 7, wherein step c thereof further includes the steps of:
a. examining each assigned vector for having an affinity for a given destination set and being at a required level;
b. counting how many assigned vectors are at a given level for a specific destination set; d. if the count of assigned vectors exceeds a threshold of operational characteristics of said computer system, issuing a warning signal to a user thereof.

* * * * *